US012035010B2

(12) United States Patent
Fukuda

(10) Patent No.: US 12,035,010 B2
(45) Date of Patent: Jul. 9, 2024

(54) VIDEO DISTRIBUTION SYSTEM, VIDEO DISTRIBUTION METHOD, INFORMATION PROCESSING DEVICE, VIDEO DISTRIBUTION PROGRAM, AND VIDEO VIEWING PROGRAM FOR DISPLAYING AVATAR OBJECTS

(71) Applicant: GREE, INC., Tokyo (JP)

(72) Inventor: Takumi Fukuda, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/883,377

(22) Filed: May 26, 2020

(65) Prior Publication Data

US 2020/0413145 A1 Dec. 31, 2020

(30) Foreign Application Priority Data

Jun. 28, 2019 (JP) .................................. 2019-120755

(51) Int. Cl.
*H04N 21/47* (2011.01)
*G06T 13/40* (2011.01)
*H04N 21/442* (2011.01)
*H04N 21/478* (2011.01)
*H04N 21/4784* (2011.01)

(52) U.S. Cl.
CPC ......... *H04N 21/4781* (2013.01); *G06T 13/40* (2013.01); *H04N 21/44204* (2013.01); *H04N 21/44218* (2013.01); *H04N 21/4784* (2013.01)

(58) Field of Classification Search
CPC .... H04N 21/4781; G06T 13/40; A61B 5/744; A63F 13/428; A63F 13/537; A63F 13/79; G06F 3/017
See application file for complete search history.

(56) References Cited

U.S. PATENT DOCUMENTS 6,227,974 B1 * 5/2001 Eilat ..................... A63F 13/005
463/40
6,493,001 B1 * 12/2002 Takagi ................ G06F 3/04815
715/706

(Continued)

FOREIGN PATENT DOCUMENTS

JP  2003-255964 A  9/2003
JP  2012-093734 A  5/2012

(Continued)

OTHER PUBLICATIONS

Translation of JP2019071960A—Content distribution system and computer system—Google Patents, https://patents.google.com/patent/JP2019071960A/en?oq=jp2019071960, Accessed Aug. 5, 2022. (Year: 2019).*

(Continued)

*Primary Examiner* — Mushfikh I Alam
(74) *Attorney, Agent, or Firm* — Oliff PLC

(57) ABSTRACT

An information processing device displays a video view of a video including a first avatar object reflecting movement of a distributing user that distributes a video on a display, receives an input operation, displays a game view of a game including a second avatar object reflecting the input operation and the movement of the distributing user on the display, and transmitting video data for distributing a video of the game to another information processing device to a server that distributes the video.

22 Claims, 9 Drawing Sheets

(56) References Cited

U.S. PATENT DOCUMENTS

| | | | |
|---|---|---|---|
| 8,944,911 B2* | 2/2015 | Avent | A63F 13/537 |
| | | | 463/31 |
| 9,789,403 B1* | 10/2017 | Furment | A63F 13/428 |
| 10,924,566 B2* | 2/2021 | Rosedale | G06F 3/017 |
| 2003/0038805 A1 | 2/2003 | Wong et al. | |
| 2009/0202114 A1* | 8/2009 | Morin | A63F 13/12 |
| | | | 382/118 |
| 2010/0070885 A1* | 3/2010 | Bromenshenkel | G06F 3/011 |
| | | | 715/757 |
| 2012/0028700 A1* | 2/2012 | Avent | A63F 13/537 |
| | | | 463/43 |
| 2013/0344966 A1 | 12/2013 | Mustafa | |
| 2015/0224399 A1* | 8/2015 | Melo | A63F 13/63 |
| | | | 463/29 |
| 2016/0059120 A1* | 3/2016 | Komorous-King | A63F 13/211 |
| | | | 463/36 |
| 2017/0003784 A1 | 1/2017 | Garg et al. | |
| 2017/0006074 A1 | 1/2017 | Oates, III | |
| 2017/0038916 A1* | 2/2017 | Beach | G06F 16/9535 |
| 2017/0106277 A1* | 4/2017 | Perdigón Rodriguez | |
| | | | G08B 6/00 |
| 2018/0028916 A1* | 2/2018 | Chen | A63F 13/497 |
| 2018/0091732 A1* | 3/2018 | Wilson | G06T 7/70 |
| 2018/0104573 A1* | 4/2018 | Jeffery | G06F 3/041 |
| 2018/0165700 A1* | 6/2018 | Onda | A63F 13/61 |
| 2018/0174347 A1* | 6/2018 | Chaney | G06T 13/40 |
| 2018/0250575 A1* | 9/2018 | Devaux | A63B 71/0619 |
| 2018/0329487 A1* | 11/2018 | Aoyama | G06F 3/011 |
| 2018/0350144 A1* | 12/2018 | Rathod | G06Q 20/3224 |
| 2019/0221022 A1* | 7/2019 | Kato | G06T 7/75 |
| 2019/0266807 A1* | 8/2019 | Lee | G06T 13/40 |
| 2020/0023280 A1* | 1/2020 | Onda | A63F 13/87 |
| 2020/0077157 A1 | 3/2020 | Kurabuchi | |
| 2020/0234481 A1* | 7/2020 | Scapel | A63F 13/213 |
| 2021/0192816 A1* | 6/2021 | Watanabe | G06V 20/40 |
| 2022/0222881 A1* | 7/2022 | Nakade | G10H 1/40 |

FOREIGN PATENT DOCUMENTS

| | | |
|---|---|---|
| JP | 2014-512199 A | 5/2014 |
| JP | 2014-171869 A | 9/2014 |
| JP | 2014-217627 A | 11/2014 |
| JP | 2014-219443 A | 11/2014 |
| JP | 2015-184689 A | 10/2015 |
| JP | 2015-191205 A | 11/2015 |
| JP | 2015-223514 A | 12/2015 |
| JP | 2016-143332 A | 8/2016 |
| JP | 2016-202550 A | 12/2016 |
| JP | 6378850 B1 | 8/2018 |
| JP | 2019-022072 A | 2/2019 |
| JP | 2019-023846 A | 2/2019 |
| JP | 2019-71960 A | 5/2019 |
| JP | 6526934 B1 | 6/2019 |
| JP | 6550549 B1 | 7/2019 |

OTHER PUBLICATIONS

Oct. 1, 2019 Office Action issued in Japanese Patent Application No. 2019-120762.

Oct. 23, 2019 Office Action issued in Japanese Patent Application No. 2019-143497.

Dec. 7, 2021 Office Action issued in Japanese Patent Application No. 2020-112715.

Tumblr, "The gift function will start!" <https://web.archive.org/web/20181214020504/https:/mirrativtmbr.tumblr.com/post/179074342628/%E3%82%AE%E3%83%95%E3%83%88%E6%A9%9F%E8%83%BD%E3%82%92%E9%96%8B%E5%A7%8B%E3%81%97%E3%81%BE%E3%81%99> (Dec. 14, 2018).

Oct. 5, 2022 Office Action issued in U.S. Appl. No. 17/363,016.

Sep. 5, 2023 Office Action issued in Japanese Patent Application No. 2022-055343.

Tumblr, "The gift function will start!" <http://web.archive.org/web/20181214025043/https://mirrativtmbr.tumblr.com/post/178631446973/%E3%82%AE%E3%83%95%E3%83%88%E6%A9%9F%E8%83%BD%E3%81%80%E3%81%AF%E3%81%98%E3%81%BE%E3%82%8A%E3%81%BE%E3%81%99> (Dec. 14, 2018).

4Gamer.net, "Will the Genvid's next-generation game live streaming system allow viewers to interfere with the game during the streaming?" <https://www.4gamer.net/games/999/G999905/20190402096/> (Apr. 4, 2019).

* cited by examiner

Fig.2A

| User ID | Distribution History | View History | Coin | Point |
|---|---|---|---|---|
| 0011 | *** | *** | 1000C | 1000Pt |
| : | : | : | : | : |

| User ID | Object Identification Information | Attachment | Attachment Part |
|---|---|---|---|
| 0011 | Hat | Allowed | Head |
| | T-shirt | Allowed | Upper Body |
| | Cat Ears | Allowed | Head |
| | : | : | : |

| User ID | Object Identification Information | Quantity | Coin |
|---|---|---|---|
| 0011 | Ring | 1 | *** |
| : | Bear Plush | 2 | *** |
| | Hanging Scroll | 1 | *** |
| | : | : | : |

| User ID | Game Identification Information | Score |
|---|---|---|
| 0011 | **** | 200 |
| | **** | 500 |
| 0020 | **** | 100 |
| : | : | : |

32F

VIDEO DISTRIBUTION SYSTEM, VIDEO DISTRIBUTION METHOD, INFORMATION PROCESSING DEVICE, VIDEO DISTRIBUTION PROGRAM, AND VIDEO VIEWING PROGRAM FOR DISPLAYING AVATAR OBJECTS

This application claims the benefit of priority from Japanese Patent Application No. 2019-120755 filed Jun. 28, 2019, the entire contents of the prior application being incorporated herein by reference.

BACKGROUND

1. Field

The following description relates to a video distribution system, a video distribution method, an information processing device, a video distribution program, and a video viewing program.

2. Description of Related Art

Referring to Japanese Laid-Open Patent Publication No. 2015-184689, a known video distribution system creates an animation of a character object based on movement (motion) of an actor and distributes a video including the created animation.

In such a video distribution system, an object may be shown in the video by operation of a viewing user. The viewing user may display, for example, a gift object that is sent to the character object in the video.

In a video distribution system such as that described above, as real-time interaction becomes more active between a distributing user distributing a video and viewing users viewing the video, there is a tendency to increase the number of users viewing the video, extend the length of viewing time, or increase the number of times the video is viewed. Therefore, there is a demand for distribution of a video that facilitates interaction between a distributing user and viewing users.

SUMMARY

It is an objective of the present disclosure to enhance interaction of a user distributing a video with viewing users of the video.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a video distribution system including circuitry is provided. The circuitry is configured to detect movement of a distributing user that distributes a video, display a video view of a video including a first avatar object reflecting movement of the distributing user on a display, receive an input operation, display a game view of a game including a second avatar object reflecting the input operation and the movement of the distributing user on the display, and transmit video data of the video including the first avatar object and video data of the game including the second avatar object to a viewing device.

In another aspect, a method for distributing a video is provided. The method includes, by circuitry of a distribution device, detecting movement of a distributing user that distributes a video, by the circuitry of the distribution device, displaying a video view of a video including a first avatar object on a display, the first avatar object reflecting movement of the distributing user, by the circuitry of the distribution device, receiving an input operation, by the circuitry of the distribution device, displaying a game view of a game including a second avatar object on the display, the second avatar object reflecting the input operation and the movement of the distributing user, and, by circuitry of a server, transmitting video data of the video including the first avatar object and video data of the game including the second avatar object to a viewing device.

In another aspect, an information processing device including circuitry is provided. The circuitry is configured to display a video view of a video including a first avatar object reflecting movement of a distributing user that distributes a video on a display, receive an input operation, display a game view of a game including a second avatar object reflecting the input operation and the movement of the distributing user on the display, and transmit video data for distributing a video of the game to another information processing device to a server that distributes the video.

In another aspect, a non-transitory computer readable medium that stores a video distribution program is provided. The video distribution program, when executed by circuitry, causes the circuitry to display a video view of a video including a first avatar object reflecting movement of a distributing user that distributes a video on a display, receive an input operation, display a game view of a game including a second avatar object reflecting the input operation and the movement of the distributing user on the display, and transmit video data of the game to a server.

In another aspect, an information processing device including circuitry is provided. The circuitry is configured to display a video view of a video including a first avatar object reflecting movement of a distributing user that distributes a video, display a game view of a game including a second avatar object reflecting an input operation of the distributing user and the movement of the distributing user, receiving an input operation of a viewing user, and send a request to display an object to a server that distributes a video.

In another aspect, a non-transitory computer readable medium that stores a video distribution program is provided. The video distribution program, when executed by circuitry, causes the circuitry to display a video view of a video including a first avatar object reflecting movement of a distributing user that distributes a video, display a game view of a game including a second avatar object reflecting an input operation of the distributing user and the movement of the distributing user, receive an input operation of a viewing user, and send a request to display an object to a server.

Other features and aspects will be apparent from the following detailed description, the drawings, and the claims.

BRIEF DESCRIPTION OF THE DRAWINGS

FIGS. 2A to 2D show data structures of user management information, possession list information, gift object information, and game history information that are stored in the server shown in FIG. 1.

The present disclosure, together with objects and advantages thereof, may best be understood by reference to the following description of the presently preferred embodiments together with the accompanying drawings.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a video distribution system will now be described with reference to the drawings.

Figure 1:
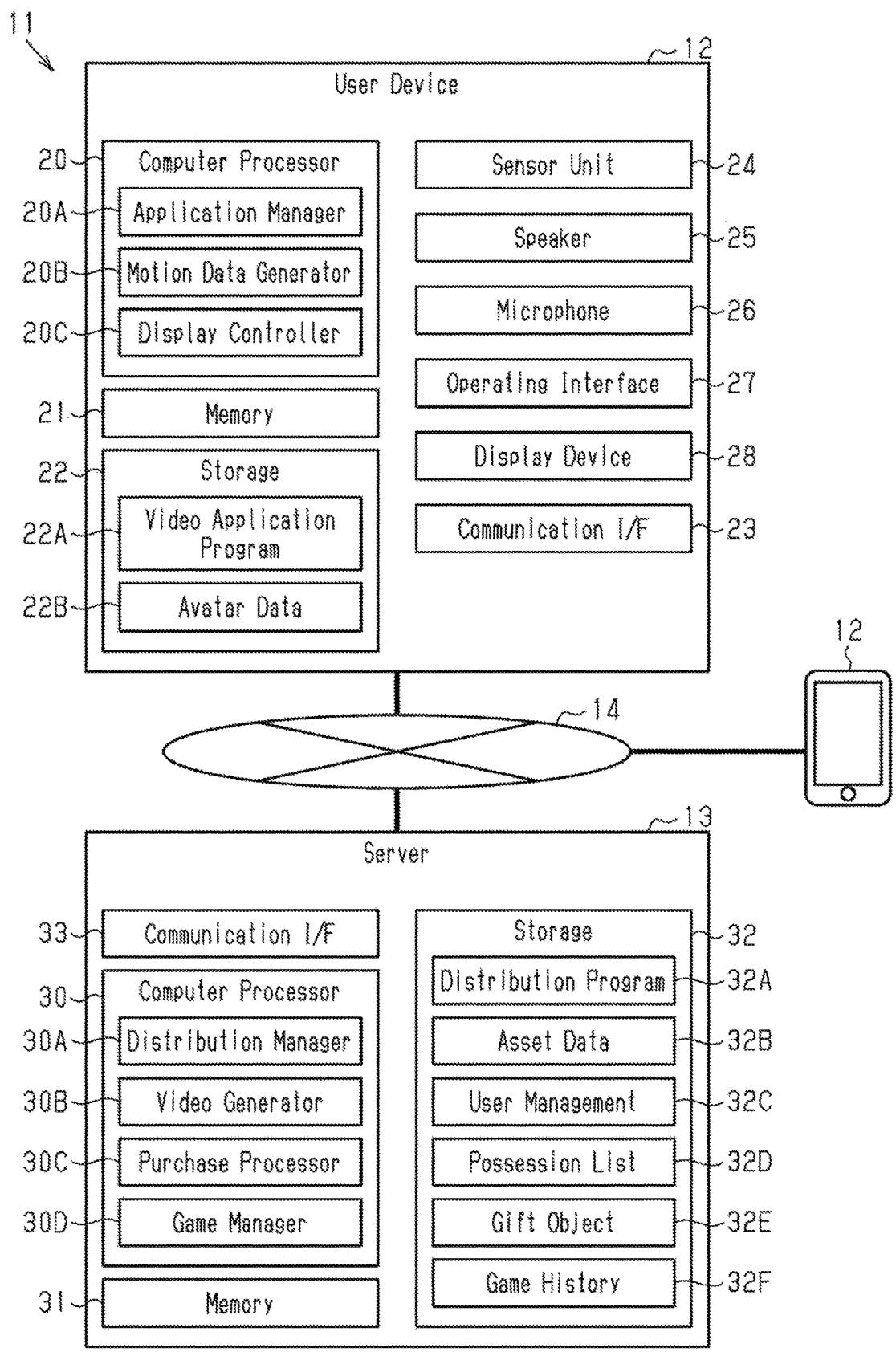
FIG. 1 is a schematic diagram showing an embodiment of a video distribution system.

As shown in FIG. 1, a video distribution system 11 includes multiple user devices 12 and a server 13. In the video distribution system 11, a user uses a user device 12 to distribute a video including an avatar object corresponding to the user to another user device 12 of another user via the server 13. A video application program is installed on the user devices 12 so that a video is viewed and distributed. Hereafter, a user distributing a video is referred to as a "distributing user." A user viewing a video distributed by the distributing user is referred to as a "viewing user." When there is no distinction between the distributing user and the viewing user, a user is simply referred to as a "user." When not distributing a video, a distributing user may become a viewing user viewing a video distributed by another distributing user. The user device 12 corresponds to a distribution device and a viewing device.

User Device

The user device 12 may be, for example, a smartphone (multifunctional phone terminal), a tablet terminal, a personal computer, a game console, a wearable computer such as a head-mounted display, or other information processing devices configured to play a video.

The user device 12 includes a computer processor 20, memory 21, storage 22 (storage medium), and a communication interface (I/F) 23. The computer processor 20 is an arithmetic unit that loads an operating system and various programs on the memory 21 from the storage 22 or other storage and executes an instruction retrieved from the memory 21. The computer processor 20 is one or more arithmetic circuits such as a central processing unit (CPU), a graphic processing unit (GPU), and a neural network processing unit (NPU). The communication I/F 23 is configured to exchange data with the server 13 and other user devices 12 through a network 14. The network 14 includes various types of networks such as a local area network and the Internet. The communication I/F 23 is implemented as hardware, software, or a combination of these.

The memory 21 is a primary storage device (storage medium) directly readable and writable by the computer processor 20 and is, for example, semiconductor memory. The storage 22 is an auxiliary storage device (storage medium) and is, for example, a magnetic disk, an optical disk, semiconductor memory, or other storage medium. Multiple storages may be combined and used as the storage 22. The storage 22 stores a video application program 22A, avatar data 22B used for drawing an avatar object, and other information used for executing the video application program 22A. In accordance with an instruction of the user, the video application program 22A switches between a distribution mode in which the user distributes a video and a viewing mode in which the user views a video distributed by another distributing user. The avatar data 22B is three-dimensional model data used to create a three-dimensional animation. The user device 12 obtains the avatar data 22B from the server 13 at a predetermined point in time. The avatar data 22B includes, for example, skeleton data and mesh data following the skeleton data and rendering the avatar object. The avatar data 22B is model data configured to move at least a head, an eye, a mouth, hair, and a shoulder of the avatar object.

The user device 12 includes a sensor unit 24, a speaker 25, a microphone 26, an operating interface (I/F) 27, and a display device 28. At least one of the sensor unit 24, the speaker 25, the microphone 26, the operating I/F 27, or the display device 28 may be provided in the same device as the computer processor 20 or may be provided separately from the computer processor 20. The sensor unit 24 corresponds to a detector. The display device 28 corresponds to a display.

The sensor unit 24 is a sensor group configured to detect a change in expressions of the user such as blinking or opening and closing of the mouth, motion of the head, motion of the upper body, and a change in the position of the user relative to the sensor unit 24. The sensor unit 24 includes, for example, at least one of a set including an emitter that emits infrared light toward the user and an infrared camera that detects the infrared light reflected from, for example, the face of the user or a set including a camera that captures an image of, for example, the face of the user and an image processor that performs an image processing on data of the image captured by the camera. The sensor unit 24 may be a sensor other than those described above. Alternatively, in addition to the sensors described above, for example, an acceleration sensor or a gyro sensor may be combined into the sensor unit 24.

The speaker 25 converts sound data into sound and outputs the sound. The microphone 26 converts voice input by the user into sound data. The operating I/F 27 is, for example, a touchscreen integrated with the display device 28, an operating button provided on a casing of the user device 12, a keyboard, a mouse, or a controller. The display device 28 outputs various types of image in accordance with an output instruction of the computer processor 20.

The computer processor 20 executes the video application program 22A stored in the storage 22 to be used as an application manager 20A, a motion data generator 20B, and a display controller 20C. The application manager 20A manages the video application program 22A. The application manager 20A sends a request to the motion data generator 20B or the display controller 20C in accordance with a request received from the operating I/F 27 or the server 13. In addition, the application manager 20A sends a request from the motion data generator 20B and the display controller 20C to the server 13 and stores various types of data received from the server 13 in the storage 22. The application manager 20A corresponds to a request sender. The motion data generator 20B corresponds to a movement detector. The display controller 20C corresponds to a display controller, a first display controller, and a second display controller.

The motion data generator 20B obtains detection data of a change in expressions of the user, motion of the head, motion of the upper body, and the position of the user relative to the sensor unit 24 from the sensor unit 24 and applies the obtained detection data to the avatar data 22B.

In the distribution mode, the display controller 20C displays a video in accordance with data received from the server 13 while displaying the avatar object in accordance with the avatar data 22B (motion data) to which the detection data is applied. In the distribution mode, the display controller 20C may combine video data created by the display controller 20C with data received from the server 13 and display a video in accordance with the combined data. Alternatively, the display controller 20C may receive the entire data for displaying a video from the server 13 and display the video in accordance with the data. When a video is not distributed or viewed, the display controller 20C retrieves image data from the storage 22 and displays various types of view on the display device 28 in response to a request from the application manager 20A. Such views are displayed, for example, when the distributing user edits the avatar object of the distributing user or configures the setting of the video application program. In the viewing mode, the display controller 20C plays a video in accordance with video data received from the server 13. The display controller 20C may play a data file that has been downloaded and stored in the storage 22 from the server 13 or may perform a streaming play that plays a video in accordance with data while receiving the data from the server 13.

Server

The server 13 will now be described. For example, a service provider provides a platform service that uses the server 13 to distribute a video. The server 13 may include, for example, a computer processor 30, memory 31, and storage 32, and a communication I/F 33. The computer processor 30 is similar to the computer processor 20 of the user device 12. The computer processor 30 may be a combination of arithmetic circuits. The memory 31, the storage 32, and the communication I/F 33 are similar to the memory 21, the storage 22, and the communication I/F 23 of the user device 12. The server 13 may include multiple devices. The computer processor 30, the memory 31, the storage 32, and the communication I/F 33 may be separately arranged in the devices.

The storage 32 stores a distribution program 32A. The computer processor 20 executes the distribution program 32A to be used as a distribution manager 30A, a video generator 30B, a purchase processor 30C, and a game manager 30D. The distribution manager 30A corresponds to a game content assigning portion and a reward assigning portion. The video generator 30B corresponds to an object display.

The distribution manager 30A stores various types of data received from the user device 12 in the storage 32 and sends requests to the video generator 30B, the purchase processor 30C, and the game manager 30D based on requests received from the user devices 12. The distribution manager 30A also receives requests from the video generator 30B, the purchase processor 30C, and the game manager 30D and sends the requests to the user devices 12. For example, in response to a request from a user device 12, the distribution manager 30A provides the user device 12 with a list of videos that are currently distributed. When receiving identification information of a video requested from the user device 12, the distribution manager 30A sends a video generation request to the video generator 30B and distributes video data generated by the video generator 30B to the user device 12 that has made the request. The distribution manager 30A also distributes the entire video data generated by the video generator 30B or part of video data, such as a message posted to the video or data of an object requested to be displayed, to the user device 12 of the distributing user. Thus, the distributing user can see the message and the object that is requested to be displayed on the screen of the user device 12.

The video generator 30B includes a physics engine. The video generator 30B uses motion data of the avatar object received from the user device 12 of the distributing user to generate a video including sound and images in a virtual space. In addition, the user device 12 of the viewing user sends requests to the video generator 30B to display an object in the video being viewed and to display a message. The video generator 30B executes processes in accordance with the requests. The object requested to be displayed is an object displayed in the virtual space and includes a gift object provided from the viewing user to the distributing user. Although not necessary, the viewing user may have to pay for sending a request to display a gift object. Alternatively, when the gift object is displayed in response to the display request, the viewing user may pay the cost.

In addition, the video generator 30B executes a process for displaying a message received from the user device 12 in the video. The message includes, for example, identification information of the viewing user (e.g., account name of user) and the posted date and time in addition to the content of the message.

The purchase processor 30C executes an object purchase process in accordance with operation of the user. The purchase process includes exchanging, selling, and transferring of an object in addition to purchasing of an object, that is, the object is obtained by paying the price (medium) such as coins that are usable in the video application program. The purchase processor 30C stores the purchased object as a possession of the user in the server 13. The sales of purchasable objects are divided to, for example, the distributing user and the service provider.

The game manager 30D receives a game execution request from the distribution manager 30A and executes the game while distributing the video. The game manager 30D cooperates with the video generator 30B to generate video data of the game and transmits the video data to the user device 12 of the viewing user.

Various types of data stored in the storage 32 of the server 13 will now be described. The storage 32 stores asset data 32B, user management information 32C, possession list information 32D, gift object information 32E, and game history information 32F.

The asset data 32B is data used to draw a virtual space configuring a video. More specifically, the asset data 32B includes, for example, data used to draw a background of the virtual space, audio data such as sound effect, three-dimensional model data (object model data) used to draw various types of object displayed in the video, and texture data.

The object model data includes data of objects that are distinguished based on modes in which users use the objects. More specifically, the object model data includes data of an object that is displayed by the distributing user and data of a gift object that is provided from the viewing user to the distributing user. The gift object includes an effect object, an attachment object, and a normal object. The effect object affects the impression of the entire view of the distributed video and is, for example, an object imitating confetti or an object imitating firework. The attachment object is displayed in the view in association with a particular part of an avatar object. The attachment object is, for example, an accessory attached to the avatar object (e.g., a hat or cap, or glasses), apparel (e.g., T-shirt), costume, or another object attachable to an avatar object. The attachment object is provided from the viewing user and then selected by the distributing user, so that the attachment object is attached to an avatar object. The normal object is a gift object excluding the attachment object and disposed in the virtual space. The normal object is, for example, an object imitating plush or bouquet.

The data of objects included in the object model data are also distinguished based on behavior of the objects in the virtual space. More specifically, the object model data includes data of an object that simulates physical behavior such as free fall or movement caused by application of force (physical behavior object) and data of an object that does not simulate physical behavior (non-physical behavior object). The physical behavior object is associated with a component (program) used to simulate physical behavior of the object. Various types of parameter such as whether to enable virtual gravity force, virtual weight of the object, air resistance in a falling direction, air resistance in a rotation direction, and friction coefficient may be set for the physical behavior object. When an event occurs such that the physical behavior object appears in the virtual space (gravity force is applied), the associated component is executed so that the physical behavior object falls in the virtual space. An increase in the air resistance in the falling direction reduces the falling speed of the physical behavior object. An object that is displayed by the distributing user and a gift object are not distinguished based on whether to perform physical behavior. The distributing user may be allowed to display both or only one of the physical behavior object and the non-physical behavior object.

A contact determination range may be set for the physical behavior object to determine a contact with another physical behavior object. The contact determination range is a three-dimensional range having a vertex and other points specified by coordinates in a virtual area coordination system (X, Y, Z). When the contact determination ranges are set for the physical behavior objects (hereafter, referred to as contact objects) and overlap (come into contact) with each other, the video generator 30B executes a simulation that causes the contact objects to come into contact with each other based on the parameters (e.g., weight and air resistance) set for the contact objects and preset dynamic arithmetic equations. At this time, contact actions of the contact objects such as rebounding or pushing each other are drawn in the video. The size and shape of the contact determination range do not necessarily have to conform to the size and shape of the object. For example, a cubic contact determination range may be set for a spherical object. In addition, for example, when the parameter of weight of the contact object is set to a large value, the contact object is more resistant to rebounding than when the parameter of weight of the contact object is set to a small value.

The user management information 32C will now be described with reference to FIG. 2A. The user management information 32C is stored for each user. The user management information 32C includes identification information of the user (user ID), video distribution history of the user, and video viewing history of the user. The user management information 32C also includes information related to a coin and a point. The coin is a medium that is purchasable by the user and usable in the video application program or the platform service providing the video application program. The coin may be exchanged with an object such as a gift object or another medium usable in the video application program. The point is assigned to a user, for example, when the user views a video for a predetermined time or longer. The point is accumulated whenever the user views a video. Limitation may be imposed on the point assigned when viewing a video such that, for example, the point is assigned up to ten times in a predetermined period or the point is assigned from when a user is registered until the user views a video ten times.

The possession list information 32D will now be described with reference to FIG. 2B. The possession list information 32D is stored for each user. The possession list information 32D includes identification information of the user (user ID) and object identification information of a possession object that can be displayed on a video distributed by the user. The possession object is, for example, a hat, a T-shirt, or cat ears. The possession list information 32D also includes information indicating whether the possession object is attachable to the avatar object and an attachment part. When the possession object is the attachment object, that is, when the possession object is attachable to the avatar object, the attachment part is information indicating which part of the avatar object the attachment object is attachable to. The user may use an object included in the possession list information 32D of the user in a video distributed by the user. When more than one object is allowed to be possessed, the possession list information 32D may include the number of objects that are possessed.

The gift object information 32E will now be described with reference to FIG. 2C. The gift object information 32E is stored for each user. The gift object information 32E includes identification information of the user (user ID), object identification information of a gift object, the number of gift objects, and the number of coins needed to purchase a gift object. The gift is a medium (element) of the video application program usable in an object or the video application program. For example, when a first user has a gift object in the gift object information 32E and a second user is distributing a video, it may be configured so that the first user is allowed to request that the gift object be displayed on the video or provided to the second user but is not allowed to use the gift object in a video distributed by the first user.

The game history information 32F will now be described with reference to FIG. 2D. The game history information 32F includes history information of a game played while a video is being distributed. The game history information 32F includes user identification information of the distributing user, game identification information assigned to a game played by the distributing user, and a score obtained in the game. The game identification information may be a number or the number of times the game is played.

An object in a virtual space will now be described with reference to FIGS. 3A to 3C.

Figure 3A:
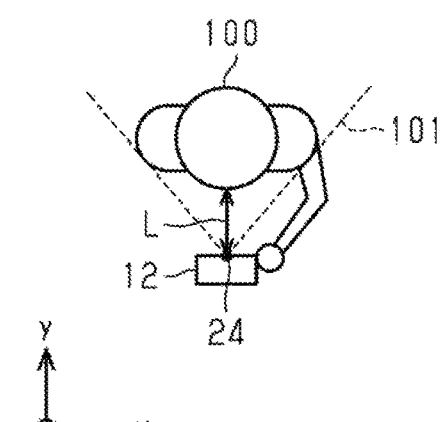
FIG. 3A schematically shows the positional relationship between a user and a user device in a coordinate system of a real space in the embodiment shown in FIG. 1.

As shown in FIG. 3A, the distributing user 100 faces the user device 12 so that at least the face of the distributing user 100 is included in a detection range 101 of the sensor unit 24, and runs a distribution application program. At this time, the distributing user 100 sets the distribution application program to the distribution mode. When the distributing user 100 operates to start a distribution in the distribution mode, motion data is sent from the user device 12 to the server 13. During the distribution of a video, the video of a virtual space including an avatar object is displayed on the display device 28 of the user device 12 of the distributing user 100. The point of view of the video is located on the position of the sensor unit 24. The position of the avatar object changes in accordance with the relative distance between the distributing user 100 and the sensor unit 24. For example, when the distributing user 100 moves away from the sensor unit 24 in the Y-direction in FIG. 2A and a relative distance L between the distributing user 100 and the user device 12 is increased, the change in the relative distance L is reflected on the position of the avatar character in the virtual space, and the avatar character moves in a rearward direction in the view. When the distributing user 100 moves in an X-direction or a counter-X-direction in FIG. 2A, the motion is reflected as motion of the avatar character to the right side or the left side in the view.

Figure 3B:
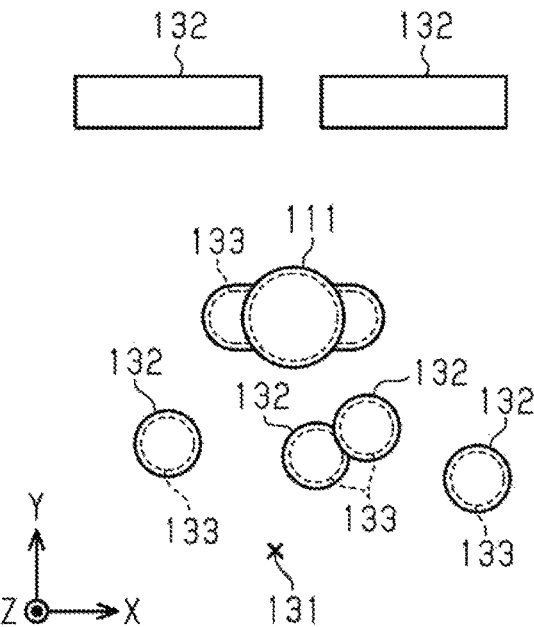
FIG. 3B schematically shows the positional relationship between objects in a coordinate system of a virtual space.

FIG. 3B shows the positional relationship between a first avatar object 111 and other objects in a coordinate system (X, Y, Z) in the virtual space. The video generator 30B generates a video including an image of the first avatar object 111 viewed from a point of view 131. The first avatar object 111 is the physical behavior object to which the contact determination range 133 is set (contact object). The virtual space includes contact objects other than the first avatar object 111. The contact objects are, for example, some portions of gift objects 132. When the contact determination ranges 133 are set for contact objects and overlap (come into contact) with each other, the video generator 30B executes a simulation that causes the contact objects to come into contact with each other based on the parameters (e.g., weight and air resistance) and preset dynamic arithmetic equations. At this time, contact actions of the contact objects such as rebounding or pushing each other are drawn in the video.

Figure 3C:
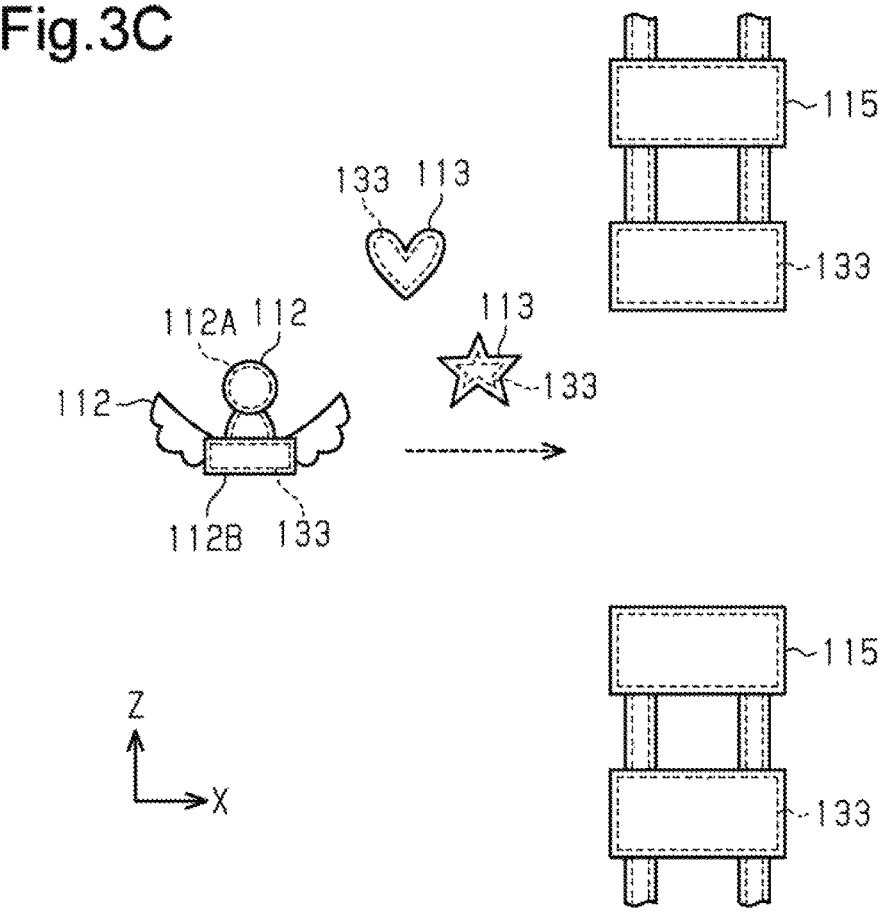
FIG. 3C schematically shows the positional relationship between objects in a coordinate system of a virtual space in a game.

FIG. 3C shows the positional relationship between objects displayed in a game view. In the game view, each object is displayed as a two-dimensional image having dimensions in sideward directions (counter-X-direction and X-direction) and vertical directions (Z-direction and counter-Z-direction) in the view. In the game view, the avatar object is displayed as a second avatar object 112. In the present embodiment, the second avatar object 112 is a two-dimensional object.

The second avatar object 112 includes an avatar body 112A and a conveyance object 112B that conveys the avatar. The second avatar object 112 automatically moves from the left side to the right side in the view. While the distributing user is performing an input operation on the user device 12, the wings of the conveyance object 112B move up and down, and the second avatar object 112 entirely moves upward. When the distributing user stops the input operation, the second avatar object 112 falls. The contact determination range 133 is set for a portion of the second avatar object 112. For example, the contact determination range 133 is not set for the wings of the conveyance object 112B and is set for the remaining part. This is because if the contact determination range 133 is set for the wings moving up and down, the probability of a contact with another contact object will increase, and the difficulty of the game will increase. The game view also displays obstacles 115. The obstacle 115 is a contact object for which the contact determination range 133 is set. The distributing user performs an input operation on the user device 12 so that the second avatar object 112 passes between the upper obstacle 115 and the lower obstacle 115. When the contact determination range 133 of the second avatar object 112 overlaps the contact determination range 133 of one of the obstacles 115, a contact action of the second avatar object 112 is drawn. In addition, an input operation to the second avatar object 112 is not allowed to be accepted, and the game ends.

With reference to FIGS. 4A to 5C, view transition when the game is played during distribution of a video will now be described. In the description, the user device 12 used to distribute a video and the user device 12 used to view a video refer to smartphones.

Figure 4A:
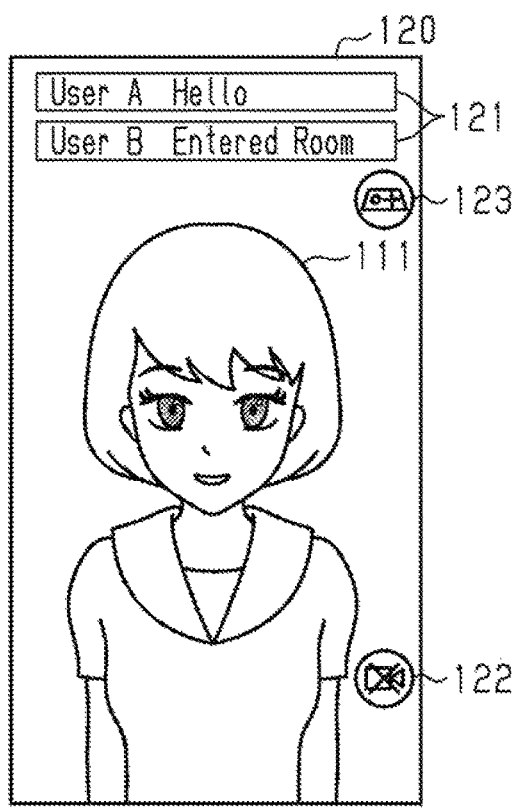
FIGS. 4A and 4B are respectively a view before the game starts and a game start view that are displayed on the user device shown in FIG. 1.

FIG. 4A is a video view 120 displayed on the user device 12 of the distributing user before transitioning to the game. The video view 120 includes the first avatar object 111. The face of the first avatar object 111 changes in accordance with changes in expressions of the distributing user. The head of the first avatar object 111 moves in accordance with motion of the head of the distributing user. Also, as described above, the position of the first avatar object 111 changes in accordance with the relative distance between the distributing user 100 and the sensor unit 24. The video view 120 displays a message 121 transmitted from the user device 12 of the viewing user for a predetermined period. The video view 120 displays a distribution switch button 122. The distributing user selects the distribution switch button 122 to start to distribute a video or stop distributing the video.

The video view 120 also displays a game start button 123 for executing the game. The game start button 123 is displayed by the distribution manager 30A of the server 13 in accordance with a predetermined schedule. For example, the game start button 123 is displayed in a video that starts to be distributed or a video that is already distributed in a period, for example, "From 18 o'clock on April 1st to 24 o'clock on April 8th." Alternatively, the game start button 123 may be constantly displayed in all videos instead of being displayed in a predetermined period. The distribution switch button 122 and the game start button 123 are not displayed on the user device 12 of the viewing user, however, a view similar to the video view 120 including the first avatar object 111 and the message 121 is displayed. The message includes a message posted from the viewing user and a message automatically displayed by the server 13. When detecting an event such as the viewing user starting to view or requesting to display a gift object, the server 13 displays a message 121 indicating "Entered Room" or a message 121 indicating "Hat Sent" with the account name of the user in the video view 120.

Figure 4B:
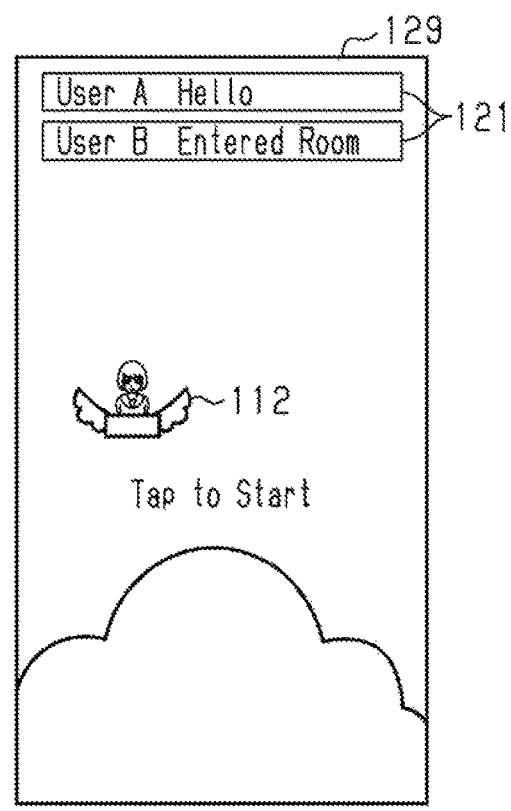

FIG. 4B is a game start view 129 displayed when the game start button 123 shown in FIG. 4A is operated. When detecting one or more tap operations on the game start view 129, the application manager 20A sends a game start request to the server 13.

Figure 5A:
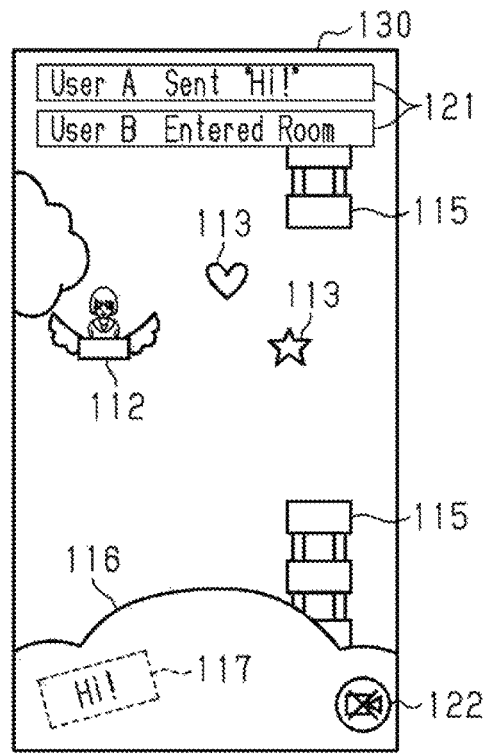
FIGS. 5A to 5C are respectively a view when the game is being executed, a view when an avatar object contacts an obstacle, and a view when the game ends that are displayed on the user device shown in FIG. 1.
Figure 5B:
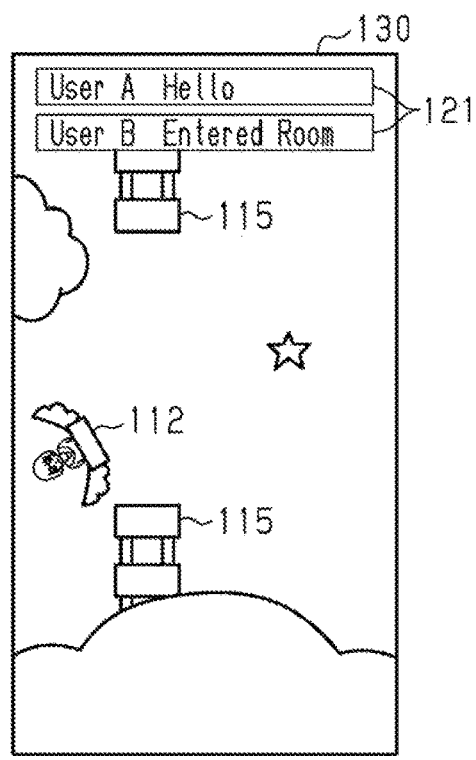
Figure 5C:
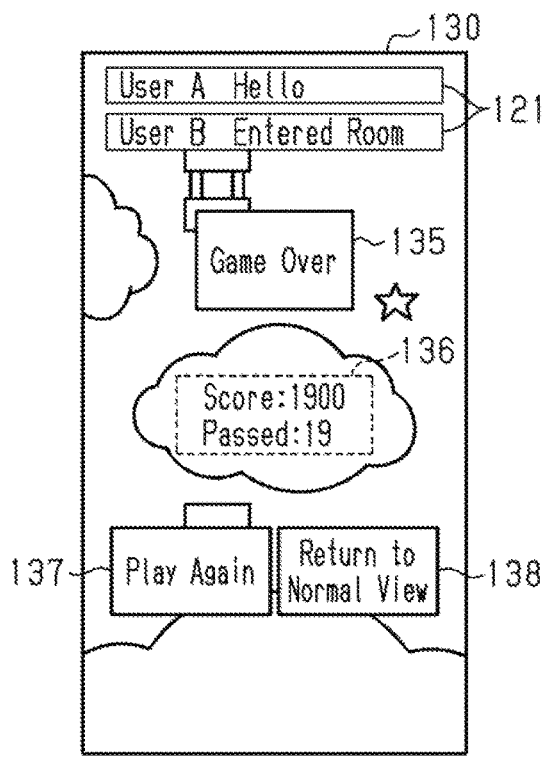

With reference to FIGS. 5A to 5C, an example of transition of the views displayed on the user device 12 of the distributing user when executing the game will now be described. Although icons displayed in the game view differ between the distributing user and the viewing user, a similar view is also displayed on the user device 12 of the viewing user.

FIG. 5A is a game view 130 in which the game is being executed. The second avatar object 112 is displayed in the game view 130. Movement of the second avatar object 112 is controlled based on an input operation (tap operation) performed on the user device 12 of the distributing user. In the game, the second avatar object 112 automatically moves from the left side to the right side in the view. The game view 130 also displays the messages 121 and a message object 117. The message object 117 is displayed in a display region 116 that is provided separately from a movement range of the second avatar object 112. For example, when an object that does not contribute to the game is requested to be displayed during the game, the object is displayed in the display region 116. The game manager 30D moves the second avatar object 112 upward only while the distributing user is performing input operation. When the input operation is not performed, a state in which gravity force is applied to the second avatar object 112 is simulated, and the second avatar object 112 falls. The distributing user repeatedly performs input operation and stops the input operation so that the second avatar object 112 passes between the two obstacles 115 without contacting the obstacles 115. Whenever the second avatar object 112 passes between the obstacles 115, the number of passed obstacles 115 is incremented, and the score is added. For example, when a pair of obstacles 115 is passed, predetermined points "100 pts" are added to a point of the user management information 32C.

Behavior (movement) of the second avatar object 112 in the virtual space is restricted more than that of the first avatar object 111. Only part of motion of the first avatar object 111 (i.e., only part of the motion of the distributing user) is drawn for the second avatar object 112. For example, the first avatar object 111 reflects changes in expressions of the distributing user, motion of the head, and motion of the upper body. However, the second avatar object 112 reflects only motion of the head of the distributing user and changes in expressions of the distributing user. That is, the second avatar object 112 does not reflect motion of the upper body of the distributing user. This is because while the conveyance object 112B and the avatar body 112A move integrally with each other, the conveyance object 112B does not follow movement of the avatar body 112A. If the second avatar object 112 is moved in the rearward direction or the frontward direction in the view or the upper body of the second avatar object 112 is moved in the sideward directions, in the second avatar object 112, a portion corresponding to the avatar body may be displayed projecting through the conveyance object.

In addition, in the game view, the second avatar object 112 moves in the vertical directions and the sideward directions, that is, in a two-dimensional space. The relative distance between the distributing user and the sensor unit 24 is reflected on the first avatar object 111 but is not reflected on the second avatar object 112. That is, movement directions of the second avatar object 112 are limited to the two-dimensional space in the vertical directions and the sideward directions.

The game view 130 also displays a support object 113 that is requested to be displayed by the viewing user. The game manager 30D determines whether the second avatar object 112 contacts the support object 113 but does not draw the contact action. When it is determined that the second avatar object 112 contacts the support object 113, a predetermined point (game content) is assigned to the score of the game history information 32F of the distributing user. For example, when the second avatar object 112 contacts a "heart" support object 113, "200 pts" are added. When the second avatar object 112 contacts a "star" support object 113, "150 pts" are added.

The game view 130 also displays the message 121 sent from the user device 12 of the viewing user. Thus, even when the view is switched from the normal, video view 120 to the game view 130, the distributing user and the viewing user may continue to communicate with each other. When switched to the game view 130, the avatar object is still displayed as the second avatar object 112 without being eliminated from the view. This allows the viewing user to readily continue to communicate with the distributing user.

FIG. 5B is an example of a view in which the second avatar object 112 has contacted an obstacle 115. When determining that the second avatar object 112 has contacted the obstacle 115, the game manager 30D cooperates with the video generator 30B to draw a contact action. An example of a contact action displays, while the obstacles 115 remain in the same position, the second avatar object 112 rebounds and falls.

FIG. 5C is the game view 130 when the game ends. When the second avatar object 112 contacts the obstacle 115 and drawing of the contact action of the second avatar object 112 is completed, the game view 130 displays a game end indication 135 and a game result indication 136. The game view 130 also displays a game replay button 137 indicating, for example, "Play Again" and a return button 138 indicating, for example, "Return to Normal View." When the game replay button 137 is operated, the game manager 30D restarts the game. When the return button 138 is operated, the game manager 30D terminates the game process. The distribution manager 30A sends a video generation request to the video generator 30B and transmits video data generated by the video generator 30B to the user device 12. When the game process is terminated and the video including the first avatar object 111 is returned, the video may display a gift object that does not directly contribute to the game such as the support object 113 requested to be displayed during the game.

Figure 6A:
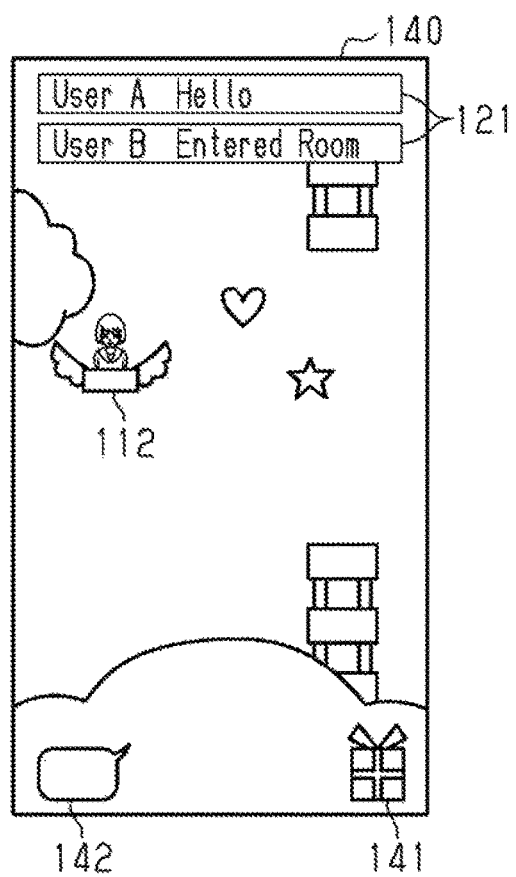
FIGS. 6A and 6B are respectively a viewing view when the game is being executed and a viewing view for requesting to display a support object that are displayed on the user device shown in FIG. 1.
Figure 6B:
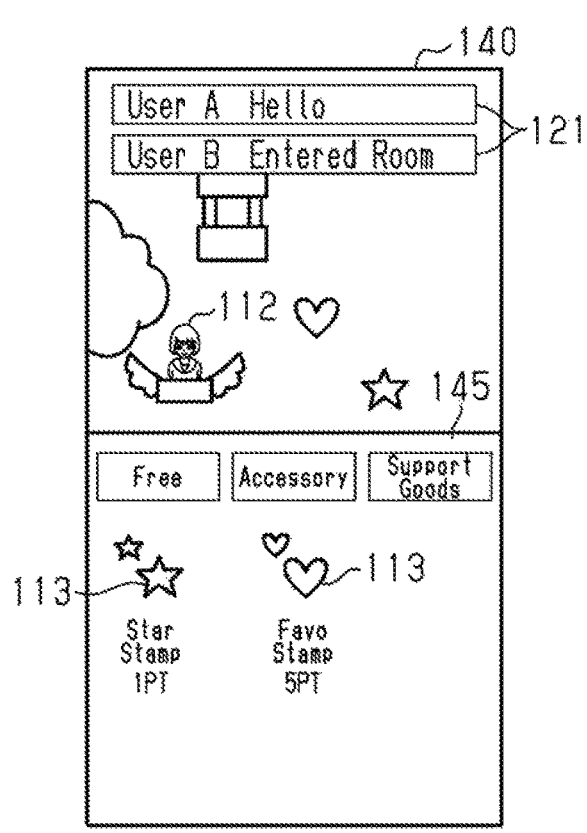

With reference to FIGS. 6A and 6B, an example of transition of a viewing view 140 of the viewing user will now be described. In FIG. 6A, the viewing view 140 displays a list display button 141 used to request to display the support object 113 and a message button 142. As shown in FIG. 6B, when receiving an operation performed on the list display button 141 by the viewing user, the application manager 20A of the user device 12 displays a gift object list 145 in the viewing view 140. When a support object 113 such as a "heart stamp" or a "star stamp" is selected from the gift object list 145, the user device 12 sends a request to display the support object 113 to the server 13. The video generator 30B of the server 13 displays the support object 113 in a predetermined position in response to the display request. At this time, the video generator 30B displays the support object 113 in a region located frontward in the traveling direction of the second avatar object 112.

Figure 7:
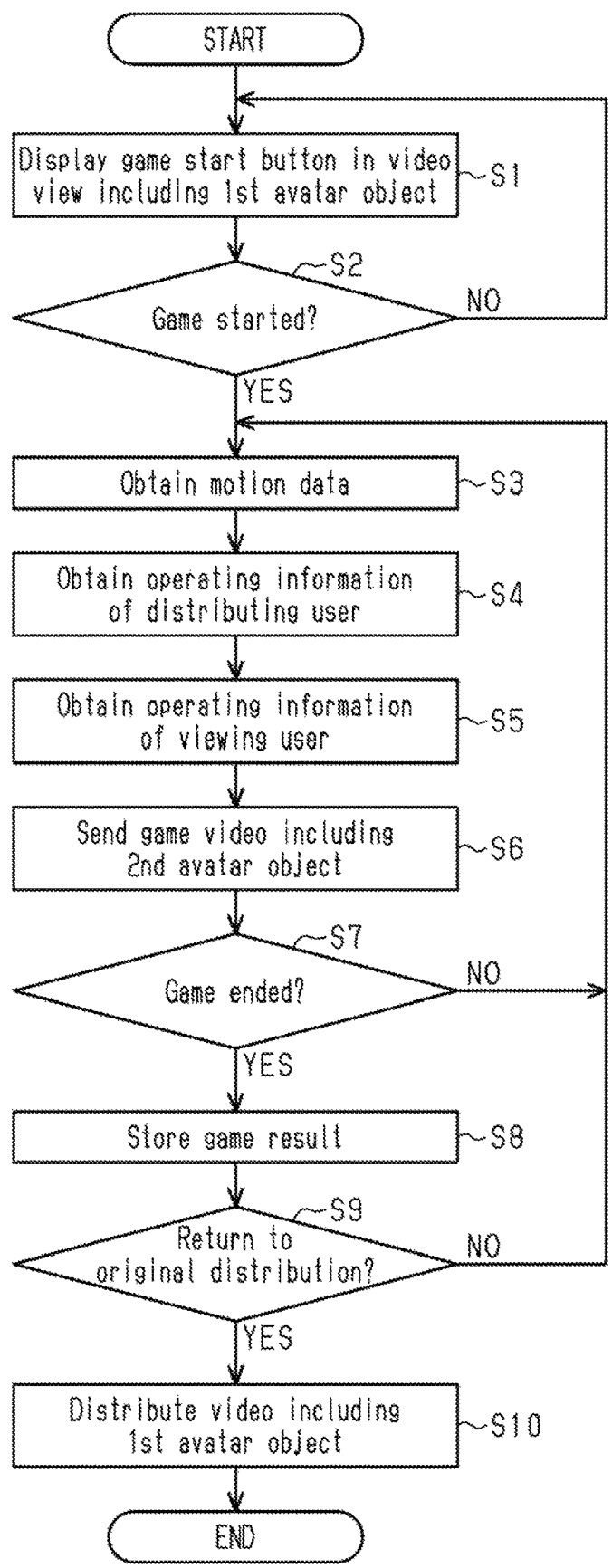
FIG. 7 is a flowchart of a process for executing the game in the embodiment shown in FIG. 1.
Figure 8:
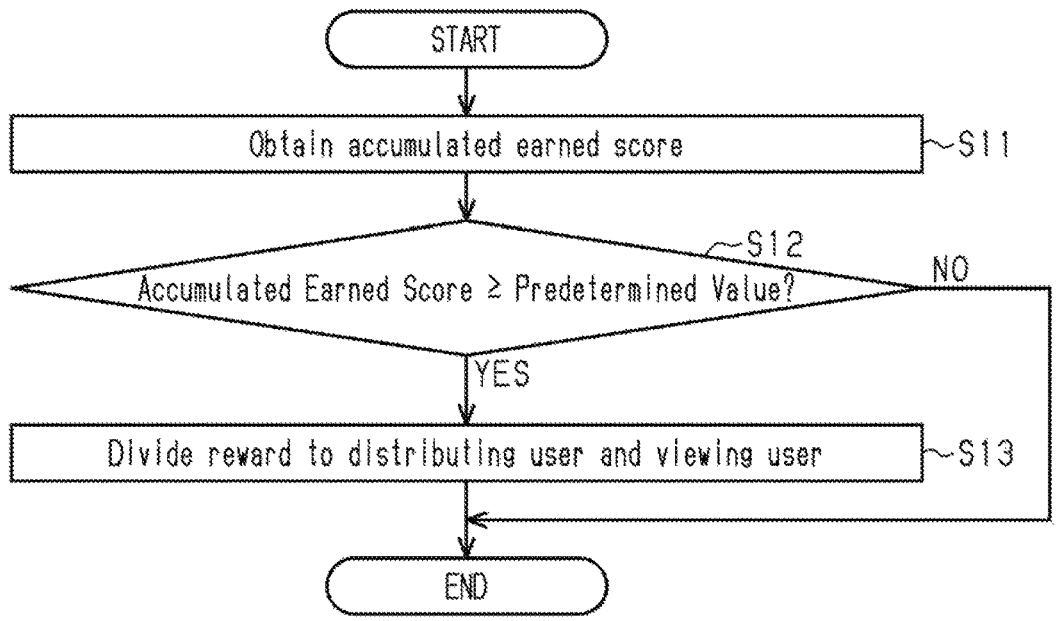
FIG. 8 is a flowchart of a process for dividing an earned score in the embodiment shown in FIG. 1.

With reference to FIGS. 7 and 8, operations of the user device 12 and the server 13 will now be described along the procedures of processes executed by the video application program.

FIG. 7 shows the procedures of a process executed by the server 13 for starting the game. It is assumed that the distributing user is distributing a video before the game is started. The video generator 30B displays the game start button 123 in the video view 120 including the first avatar object 111 at a predetermined point in time (step S1). When the game start button 123 is operated, the user device 12 sends a game start request to the server 13.

The distribution manager 30A determines whether to start the game based on whether the game start request is received from the user device 12 of the distributing user (step S2). While determining not to start the game (step S2: NO), the distribution manager 30A continues to display the game start button 123 in the video view 120. When a game executable period ends, the distribution manager 30A hides or does not display the game start button 123.

When determining to start the game (step S2: YES), the distribution manager 30A obtains motion data from the user device 12 of the distributing user (step S3). The distribution manager 30A also obtains operation information from the user device 12 of the distributing user (step S4). In the same manner, the distribution manager 30A obtains operation information from the user device 12 of the viewing user (step S5). The game manager 30D sends a video generation request to the video generator 30B to move the second avatar object 112 corresponding to motion data based on operation information and also transmits a game video including the support object 113 corresponding to operation information of the viewing user to the user device 12 of the viewing user and the user device 12 of the distributing user (step S6).

The game manager 30D determines whether the mission (goal) of the game is unaccomplished or the mission of the game is accomplished and the game is ended (step S7). More specifically, the game manager 30D determines whether the second avatar object 112 has contacted the obstacle 115 or the mission is accomplished. While determining that the game is not ended (step S7: NO), the game manager 30D repeats steps S3 to S6.

When determining that the game is ended (step S7: YES), the game manager 30D stores the game history information 32F as the game result (step S8). Also, the video generator 30B transmits data of a game view including, for example, the game end indication 135, the game replay button 137, and the return button 138 to the user device 12. The distribution manager 30A waits for a request from the user device 12 to determine whether to return to distribution of the original video (step S9). When receiving a request from the user device 12 to return to the original video, the distribution manager 30A determines to return to the original video (step S9: YES) and sends the video generation request to the video generator 30B. The video generator 30B uses motion data obtained from the user device 12 of the distributing user to generate a video including the first avatar object 111 and distribute the video to the user device 12 (step S10). Until the distribution ends, the process returns to step S1, and the video generator 30B displays the game start button 123 in the video view 120.

When receiving a request from the user device 12 to continue the game, the distribution manager 30A determines to continue the game (step S9: NO), and the process returns to step S3.

Division of a reward based on the game result will now be described with reference to FIG. 8. While holding an event of playing the game in a predetermined period or when the event ends, the game manager 30D obtains the accumulated earned score (step S11). More specifically, the total of all scores in the game history information 32F associated with the distributing user is calculated. That is, all of the scores that have been earned in the event are added.

The game manager 30D determines whether the accumulated earned score is greater than or equal to a predetermined value (step S12). When the accumulated earned score is greater than or equal to the predetermined value (step S12: YES), the reward such as coins or points is divided between the distributing user and the viewing users who requested to display the support objects 113 while the game was being executed (step S13). For example, the reward may be equally divided in the number of the distributing user and the viewing users or may be divided so that the distributing user obtains more.

The advantages of the present embodiment will now be described.

(1) When distributing a video of the game, the second avatar object 112, which differs from the first avatar object 111 displayed in the normal video, is displayed. Thus, a video of a game that utilizes characteristics of an avatar object is distributed. This may increase the number of the viewing users of the video, extend the length of viewing time, and increase the number of times the video is viewed. Even when the view is transited from the normal video view 120 to the game view 130, the avatar object continues to be displayed. The distributing user and the viewing user readily continue to communicate with each other. This enhances interaction between the distributing user and the viewing user of the video.

(2) When the second avatar object 112 contacts the support object 113 displayed by the viewing user in the video of the game, a score is assigned to the distributing user. Thus, the viewing user participates in the game and cooperates with the distributing user to play the game. This enhances interaction between the distributing user and the viewing user.

(3) When distributing a video of a game, a process related to procedures of the game is executed in addition to a process related to the distribution of the video. The movable range of the second avatar object 112 is set to be smaller than the movable range of the first avatar object 111. This reduces processing loads on the server when distributing the video of the game.

(4) The video of the game is configured by two-dimensional images. This reduces processing loads on the server 13.

(5) When the score obtained in the game becomes greater than or equal to the predetermined value, the reward is assigned to the distributing user and the viewing users who sent the display requests. This increases motivation of the distributing user for distributing the video of the game. Also, motivation of the viewing users for requesting to display objects will be increased.

The embodiment may be modified as follows. The embodiment and the following modified examples can be combined as long as the combined modified examples remain technically consistent with each other.

In the embodiment, a video of the game in which the second avatar object 112 passes between the obstacles 115 is distributed. A video of other types of game may be distributed. For example, the game may be, for example, a role-playing game, a shooter game, an action game, a racing game, a fighting game, a social simulation game, a romance simulation game, a puzzle game, a card game, a sports game, and a rhythm game. The viewing user may perform actions other than a request to display the support object 113 in the game.

Figure 9:
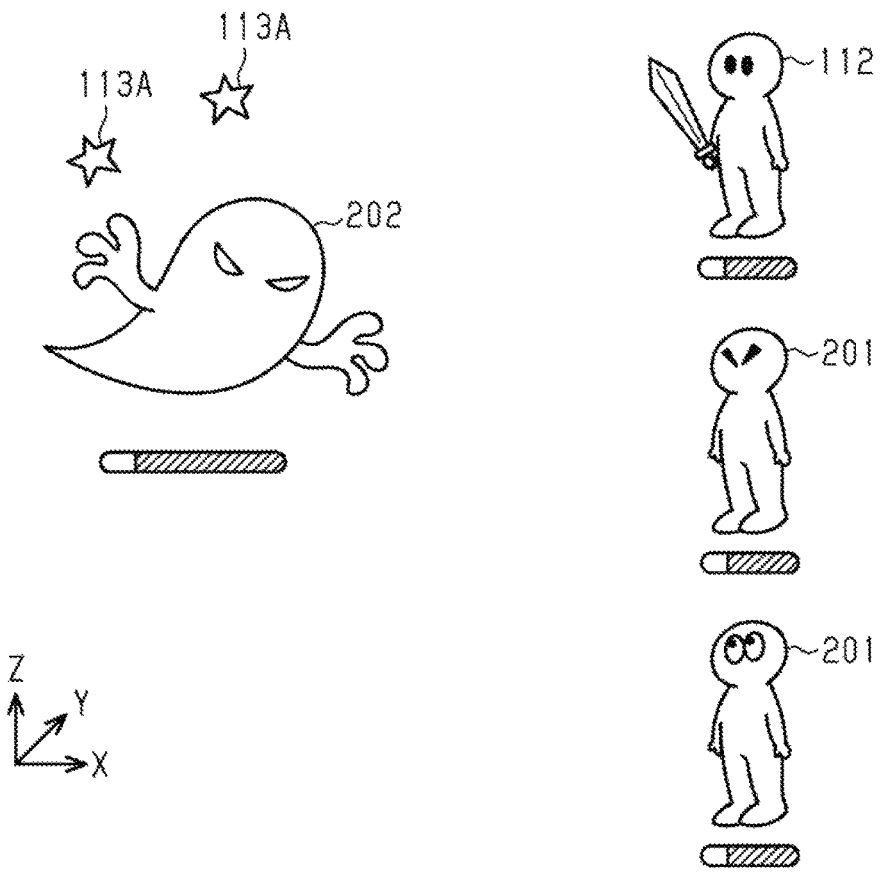
FIG. 9 schematically shows a virtual space in a modified example of the video distribution system shown in FIG. 1 when distributing a role-playing game including an avatar object.

FIG. 9 is an example of a game view of a role-playing game that a distributing user and a viewing user cooperate to play. The game view displays a main character 112 operated based on input operation of the distributing user, subcharacters 201 operated based on input operation of viewing users, and an opponent character 202 fights against the main character 112 and the subcharacters 201. The main character 112 may be a second avatar object corresponding to a first avatar object or may be a character in the game other than an avatar object. In the embodiment, the game view is two-dimensional. Instead, the game view may be three-dimensional. That is, for example, the main character 112 and the subcharacters 201 may move in the rearward direction (Y-direction) in the view in addition to the X-direction and the Z-direction based on input operation of the user. Viewing users who cannot participate as the subcharacters 201 may send a request to display objects 113A. The objects 113A may, for example, apply damage to the opponent character 202 or may increase parameters of the main character 112 and the subcharacters 201. When distributing the video of the game, voice of the distributing user may or may not be output. This configuration also allows the distributing user and the viewing users to cooperate to play the game and enhances interaction between the distributing user and the viewing users.

Figure 10:
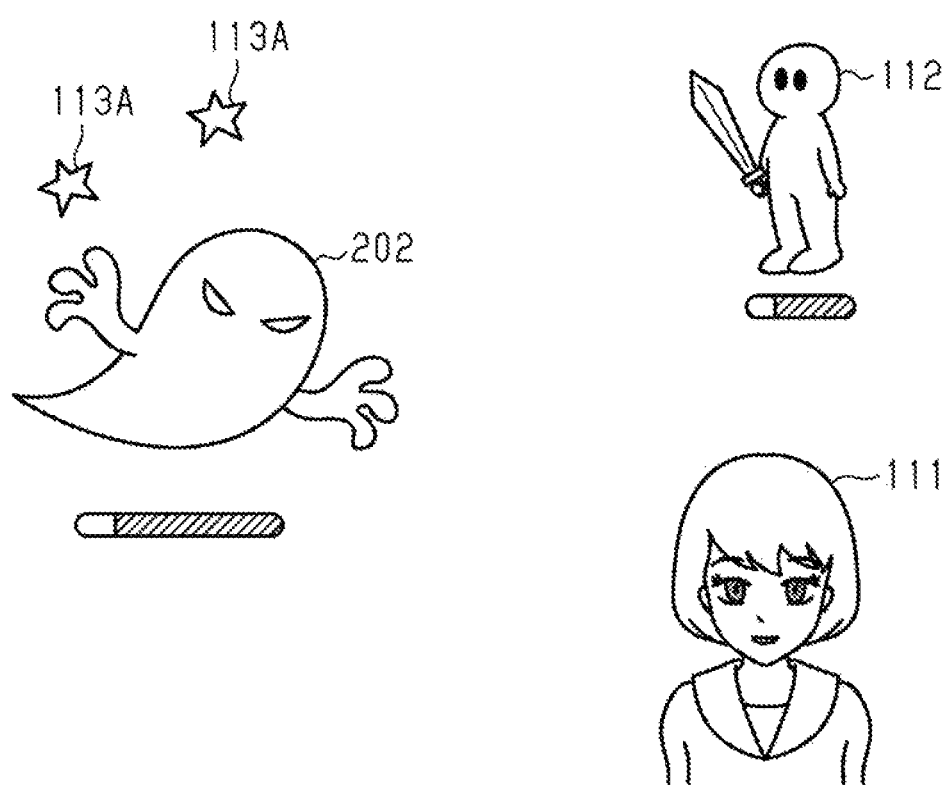
FIG. 10 schematically shows a virtual space in another modified example of the video distribution system shown in FIG. 1.

As shown in FIG. 10, the first avatar object 111 may appear in a game in which the main character 112 is operated by input operation of the distributing user. For example, the first avatar object 111 is displayed as a play-by-play commentator object. The first avatar object 111 may be displayed in a still image that does not reflect movement of the distributing user or in an animation that reflects movement of the distributing user. When displayed in an amination reflecting movement of the distributing user, the first avatar object 111 may move less than when displayed in a video of the normal first avatar object 111.

The game may be configured so that multiple distributing users cooperate. In an example of the game, while an avatar object corresponding to one of the distributing users keeps opening a passage of a game field, another avatar object corresponding to the other distributing user passes through the passage. In this case, the server 13 receives motion data or detection data from the user devices 12 of the multiple distributing users and aggregates them to generate video data.

In the embodiment, during distribution of a video including an animation of an avatar object, the game is started. Instead, without distributing the video including the animation of the avatar object, a game executing view may be distributed.

In the embodiment, the game proceeds with tap operation. Instead of or in addition to tap operation, the game may proceed with input operation of the user such as double-tap, swipe, long press, drag, pinch in, and pinch out. Alternatively, the input operation for causing the game to proceed may differ from operation performed on the touchscreen. The game may proceed in accordance with, for example, motion of the face of the distributing user detected by the sensor unit 24. The input operation may be, for example, blink speed, the number of blinks, eyebrow motion, opening or closing speed of a mouth, or the number of times the mouth is open or closed.

In the embodiment, when it is determined that the second avatar object 112 contacts the support object 113 in the game, the predetermined points (game contents) are assigned to the score of the game history information 32F of the distributing user. The game contents are not limited to points and may be any electronic data used in the game. The electronic data may be obtained, possessed, used, managed, exchanged, combined, reinforced, sold, discarded, or gifted by the user in the game. The game contents include, for example, any medium such as a card, an item, virtual currency, a ticket, a character, an avatar, level information, status information, and parameter information (e.g., physical value and attack power), skill, ability, a spell, and a job. Usage modes of the game contents are not limited to those described in this specification.

In the embodiment, when the distributing user selects an attachment object, the attachment object is attached to the avatar object. Instead, when viewing users provides attachment objects, the provided attachment objects may be attached to the avatar object in the order of the provision for a predetermined time.

In the embodiment, a possession object included in the possession list information 32D of a user can be displayed in a video distributed by the user. Instead, an object associated with the user may be usable in a video distributed by the user or another user without distinction between a possession object and a gift object. For example, a first user may provide a possession object included in the possession list information 32D of the first user to a second user.

In the embodiment, the server 13 executes the process for displaying contact of contact objects. Instead, the user device 12 may execute the contact displaying process. When the storage 32 of the server 13 stores data used in the contact displaying process, the user device 12 requests for data from the server 13 or requests to write data in the server 13. Alternatively, the user device 12 and the server 13 may store the same data and synchronize the data at a predetermined point in time.

In the embodiment, the avatar object reflecting motion is transmitted from the user device 12 to the server 13. Instead, data detected by the sensor unit 24 may be transmitted to the server 13, and the server 13 may apply the detected data to the avatar data 22B stored in the storage 32.

In the embodiment, the video application program is installed on the user device 12 so that a video is viewed and distributed. Instead, an application program for viewing a video may be separate from an application program for distributing a video. A user who only views a video installs the viewing application program on the user device 12. A user who only distributes a video installs the distribution application program on the user device 12. A user who views and distributes a video installs both of the application programs on the user device 12.

Various types of information stored in the storage 32 of the server 13 such as the asset data 32B, the user management information 32C, the possession list information 32D, the gift object information 32E, and the game history information 32F may be stored in the storage 22 of the user device 12.

The computer processor 20 of the user device 12 may assume at least some of the functions in the distribution manager 30A, the video generator 30B, the purchase processor 30C, and the game manager 30D of the server 13.

The motion data generator 20B obtains detection data detecting a change in expressions of the user, motion of the head, motion of the upper body, and the position of the user relative to the sensor unit 24 from the sensor unit 24. The motion data generator 20B may obtain at least one of them. In addition to or instead of at least one of a change in expressions of the user, motion of the head, motion of the upper body, and the relative position of the user, the motion data generator 20B may obtain another detection data such as detection data that detects motion other than motion of the head and may apply the obtained data to the avatar data 22B.

In the embodiment, the server 13 includes the game manager 30D. Instead, the user device 12 may include the game manager 30D. In this case, the user device 12 transmits video data of a game view generated on the user device 12 to the server 13. The server 13 transmits the video data and a message displayed in the video in the game view to the user device 12 of the viewing user. Alternatively, the game manager 30D may be included in a game server other than the server 13. The server 13, which distributes the video, and the game server are connected via the network 14. The server 13 obtains video data of the game view from the game server and transmits the data including information of the message to the user device 12 of the viewing user. This configuration also enhances interaction between the distributing user and the viewing user.

Each of the movement detector, the first display controller, an operating information obtaining portion, the second display controller, the distribution manager, the request sender, the object display, the game content assigning portion, the display controller, and the reward assigning portion may be included in the server 13 or the user device 12. The server 13 may include, for example, the first display controller and the second display controller. In this case, the server 13 may obtain detection data of the sensor unit 24 from the user device 12, use the avatar data 22B stored in the storage 32 to generate a video including the avatar object, and display the video in the display device 28 of the user device 12. The user device 12 may include the object display. In this case, the user device 12 may receive a display request including identification information of an object from the server 13 and display the object based on the display request. This corresponds to, for example, when the user device 12 executes a native application of a game installed on the storage 22. When the user device 12 executes the native application, the user device 12 may include the game content assigning portion and the reward assigning portion.

In the embodiment, the view is transited from a video view including the first avatar object 111 to a video view including the second avatar object 112. Instead of displaying the video view including the first avatar object 111, a game view including the second avatar object 112 may be displayed from when the video starts to be distributed. Also, in this case, the game view including the second avatar object 112 may be displayed until the distribution of the video is completed. Alternatively, before the distribution of the video is completed, the view may be transited from the game view including the second avatar object 112 to a video view including the first avatar object 111.

The virtual space displayed in the video may be an augmented reality space. For example, the background of the virtual space may be a video of the real world captured by a camera of the user device 12.

In the embodiment, the user device 12 is an information processing device such as a smartphone, a mobile phone, a tablet terminal, a personal computer, a game console, and a wearable computer such as a head-mounted display. Instead, the user device 12 may be a system including at least one of the information processing devices, an input device, and an output device. For example, the user device 12 may be a system in which a game console including the computer processor 20 mutually exchanges data with the sensor unit 24, a controller used as the operating I/F 27, the speaker 25, and the display device 28 that are provided separately from the game console. The user device 12 may be a system in which an information processing device such as a personal computer mutually exchanges data with the sensor unit 24, a controller used as the operating I/F 27, the speaker 25, and a wearable display used as the display device 28 that are provided separately from the information processing device. Alternatively, a user system for distribution may be installed in a studio for distributing a video and include an information processing device, the sensor unit 24, the operating I/F 27, the speaker 25, and the display device 28 that are separately provided.

In the embodiment, the user device 12 includes the sensor unit 24. Instead, at least part of the sensor unit 24 may be arranged on the body of the distributing user or in the vicinity of the distributing user. For example, the sensor unit 24 may include an emitter that emits detection light such as infrared light at predetermine intervals and a light receiver attached to the body of the distributing user. The light receiver receives the detection light and transmits the detection result to the computer processor 20. Alternatively, the sensor unit 24 may include, for example, a camera that detects a marker attached to the body of the distributing user.

The computer processors 20 and 30 are not limited to one that performs software processing on all processes executed by itself. For example, the computer processors 20 and 30 may include a dedicated hardware circuit (e.g., application specific integrated circuit (ASIC)) configured to perform hardware processing on at least some of the processes executed by itself. That is, the computer processors 20 and 30 be configured to be circuitry including: 1) one or more processors that operate according to a computer program (software); 2) one or more dedicated hardware circuits that execute at least some of the various processes, or 3) a combination of these. The processor includes a CPU and memory such as RAM and ROM. The memory stores program codes or commands configured to cause the CPU to execute processes. The memory, or a computer readable medium, includes any type of medium that is accessible by a general-purpose computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A video distribution system comprising:
circuitry configured to
    detect real movement of a distributing user that distributes a video to a viewing device of a viewing user, the real movement including changes in expression of the distributing user,
    display on a display a video view of the video including a first avatar object, a first user operation object, and a second user operation object, the first avatar object reflecting the detected real movement of the distributing user including the changes in expression of the distributing user, and the video view not including gameplay,
    responsive to an operation to the first user operation object by the distributing user, start or stop distributing the video,
    responsive to an operation to the second user operation object by the distributing user, display a game view on the display, and
    during display of the game view on the display,
        receive a first input operation,
        display the game view of a game including a second avatar object on the display, the second avatar object reflecting the first input operation and the detected real movement of the distributing user including the changes in expression of the distributing user,
        transmit video data of the video including the first avatar object and video data of the game including the second avatar object to the viewing device,
        send a request to display an object based on a second input operation of the viewing user to a server that distributes the video, and
        display the object in the game view including the second avatar object,
    wherein
        the viewing user is a first viewing user,
        the viewing device is a first viewing device, and
        during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

2. The video distribution system according to claim 1, wherein the circuitry is further configured to
    assign a game content to the distributing user in response to the request.

3. The video distribution system according to claim 2, wherein
    the circuitry is further configured to assign a reward to the distributing user and the viewing user in response to a score obtained in the game being greater than or equal to a predetermined value.

4. The video distribution system according to claim 1, wherein
    the first avatar object is set to be movable in a first range in the video view,
    the second avatar object is set to be movable in a second range in the game view, and
    the second range is smaller than the first range.

5. The video distribution system according to claim 1, wherein the circuitry is further configured to
    before the distributing user starts the game, display the video including the first avatar object as a three-dimensional video reflecting the real movement of the distributing user that is detected on the display, and
    after the distributing user starts the game, display the game view in a two-dimensional video including the second avatar object reflecting the detected real movement of the distributing user on the display.

6. A method for distributing a video, the method comprising:
    by circuitry of a distribution device, detecting real movement of a distributing user that distributes a video to a viewing device of a viewing user, the real movement including changes in expression of the distributing user,
    by the circuitry of the distribution device, displaying on a display a video view of the video including a first avatar object, a first user operation object, and a second user operation object, the first avatar object reflecting the detected real movement of the distributing user including the changes in expression of the distributing user, and the video view not including gameplay,
    by the circuitry of the distribution device, responsive to an operation to the first user operation object by the distributing user, starting or stopping distributing the video,
    by the circuitry of the distribution device, responsive to an operation to the second user operation object by the distributing user, displaying a game view on the display, and
    by the circuitry of the distribution device, during display of the game view on the display,
        receiving a first input operation,
        displaying the game view of a game including a second avatar object on the display, the second avatar object reflecting the first input operation and the detected real movement of the distributing user including the changes in expression of the distributing user,
        transmitting video data of the video including the first avatar object and video data of the game including the second avatar object to the viewing device,
        sending a request to display an object based on a second input operation of the viewing user to a server that distributes the video, and
        displaying the object in the game view including the second avatar object,
    wherein
        the viewing user is a first viewing user,
        the viewing device is a first viewing device, and
        during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

7. An information processing device comprising:
circuitry configured to
    display on a display a video view of a video including a first avatar object, a first user operation object, and a second user operation object, the first avatar object reflecting detected real movement of a distributing user that distributes the video to a viewing device of a viewing user, the real movement including changes in expression of the distributing user, and the video view not including gameplay, responsive to an operation to the first user operation object by the distributing user, start or stop distributing the video, responsive to an operation to the second user operation object by the distributing user, display a game view on the display, and during display of the game view on the display,
receive a first input operation,
display the game view of a game including a second avatar object on the display, the second avatar object reflecting the first input operation and the detected real movement of the distributing user including the changes in expression of the distributing user,
transmit video data, for distributing a video of the game to the viewing device, to a server that distributes the video,
receive an object based on a request to display the object that is based on a second input operation of the viewing user and is sent to the server, and
display the object in the game view including the second avatar object, wherein
the viewing user is a first viewing user,
the viewing device is a first viewing device, and
during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

8. A non-transitory computer readable medium that stores a video distribution program, wherein the video distribution program, when executed by circuitry, causes the circuitry to display on a display a video view of a video including a first avatar object, a first user operation object, and a second user operation object, the first avatar object reflecting detected real movement of a distributing user that distributes the video to a viewing device of a viewing user, the real movement including changes in expression of the distributing user, and the video view not including gameplay, responsive to an operation to the first user operation object by the distributing user, start or stop distributing the video, responsive to an operation to the second user operation object by the distributing user, display a game view on the display, and during display of the game view on the display,
receive a first input operation,
display the game view of a game including a second avatar object on the display, the second avatar object reflecting the first input operation and the detected real movement of the distributing user including the changes in expression of the distributing user,
transmit video data of the game to a server,
receive an object based on a request to display the object that is based on a second input operation of the viewing user and is sent to the server, and
display the object in the game view including the second avatar object, wherein
the viewing user is a first viewing user,
the viewing device is a first viewing device, and during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

9. An information processing device comprising circuitry configured to:

display a video view of a video including a first avatar object reflecting detected real movement of a distributing user that distributes the video to the information processing device, the information processing device belonging to a viewing user, the real movement including changes in expression of the distributing user, and the video view not including gameplay, display a game view of a game including a second avatar object reflecting a first input operation of the distributing user and the detected real movement of the distributing user including the changes in expression of the distributing user, wherein the first avatar object and the second avatar object correspond to an avatar of the distributing user, receive a second input operation of the viewing user, send a request to display an object based on the second input operation to a server that distributes the video, and display the object in the game view including the second avatar object, wherein the viewing user is a first viewing user,
the information processing device is a first viewing device, and during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

10. A non-transitory computer readable medium that stores a video distribution program, wherein the video distribution program, when executed by circuitry, causes the circuitry to display a video view of a video including a first avatar object reflecting detected real movement of a distributing user that distributes the video to the circuitry, the circuitry belonging to a viewing user, the real movement including changes in expression of the distributing user, and the video view not including gameplay, display a game view of a game including a second avatar object reflecting a first input operation of the distributing user and the detected real movement of the distributing user including the changes in expression of the distributing user, wherein the first avatar object and the second avatar object correspond to an avatar of the distributing user, receive a second input operation of the viewing user, send a request to display an object based on the second input operation to a server that distributes the video, and display the object in the game view including the second avatar object, wherein the viewing user is a first viewing user,
the circuitry is a first viewing device, and during distribution of the video to the first viewing device of the first viewing user, video data of the game including the object, which is displayed in the game view including the second avatar object based on the second input operation of the first viewing user, is transmitted to a second viewing device of a second viewing user that is different from the first viewing user.

11. The video distribution system according to claim 1, wherein
the circuitry detects the real movement of the distributing user based on data received from one or more sensors.

12. The video distribution system according to claim 11, wherein
the data received from the one or more sensors includes at least one of data of a facial expression of the distributing user, data of a position of the distributing user relative to the one or more sensors, and data of motion of a body portion of the distributing user.

13. The video distribution system according to claim 1, wherein
the circuitry is configured to store user management information including identification information of the distributing user, video distribution history of the distributing user, and video viewing history of the distributing user.

14. The video distribution system according to claim 1, wherein
the first input operation is performed by the distributing user.

15. The video distribution system according to claim 1, wherein
movement of the second avatar object in the game reflects only a portion of the detected real movement of the distributing user.

16. The video distribution system according to claim 1, wherein
a contact determination range is set for at least a portion of the second avatar object to determine contact between the second avatar object and another object in the game.

17. The video distribution system according to claim 16, wherein
one or more points are assigned to the distributing user in response to the second avatar object contacting a first type of the other object, and
the game is ended in response to the second avatar object contacting a second type of the other object.

18. The video distribution system according to claim 1, wherein
the first avatar object and the second avatar object correspond to an avatar of the distributing user.

19. The video distribution system according to claim 18, wherein
the operation to the second user operation object by the distributing user switches from the video view to the game view, and the first avatar object is not displayed upon switching to the game view.

20. The video distribution system according to claim 15, wherein
movement of the first avatar object in the video view reflects all of the detected real movement of the distributing user.

21. The video distribution system according to claim 2, wherein
the object is a support object that is displayed in the game view in response to the request from the viewing user, and
a score is assigned to the distributing user in the game in response to determining that the second avatar object contacts the support object.

22. The video distribution system according to claim 1, wherein
a position of the first avatar object in the video view changes in response to a change in a relative distance between the distributing user and one or more sensors that detect the real movement of the distributing user.

* * * * *